United States Patent
Jang et al.

(10) Patent No.: US 8,275,383 B2
(45) Date of Patent: Sep. 25, 2012

(54) SYSTEM FOR RANGING BASED ON PARTITIONED RADIO RESOURCE

(75) Inventors: Hee Jin Jang, Busan (KR); Su Won Lee, Cheongju-si (KR); Daehyoung Hong, Seoul (KR); Bongjhin Shin, Seoul (KR)

(73) Assignees: Samsung Electronics Co., Ltd., Suwon-si (KR); Industry-Academic Cooperation Foundation, Sogang University, Seoul (KR)

( * ) Notice: Subject to any disclaimer, the term of this patent is extended or adjusted under 35 U.S.C. 154(b) by 995 days.

(21) Appl. No.: 12/264,291

(22) Filed: Nov. 4, 2008

(65) Prior Publication Data
US 2009/0247202 A1  Oct. 1, 2009

(30) Foreign Application Priority Data
Mar. 31, 2008  (KR) .................. 10-2008-0029837

(51) Int. Cl.
*H04W 72/04*   (2009.01)

(52) U.S. Cl. .................. 455/452.1; 455/509; 455/452.2; 455/456.3

(58) Field of Classification Search .................. 455/509, 455/450, 452.1, 452.2, 453, 456.1, 456.3, 455/517, 519, 447, 446; 370/329
See application file for complete search history.

(56) References Cited

U.S. PATENT DOCUMENTS

| | | | | |
|---|---|---|---|---|
| 2008/0014954 A1* | 1/2008 | Matsumoto et al. | .......... | 455/450 |
| 2008/0232320 A1* | 9/2008 | Lee et al. | .......... | 370/329 |
| 2010/0091728 A1* | 4/2010 | Kim et al. | .......... | 370/329 |

* cited by examiner

*Primary Examiner* — John J Lee
(74) *Attorney, Agent, or Firm* — NSIP Law

(57) ABSTRACT

A method for ranging in a wireless communication system and a communication apparatus and/or system using the same are provided. A base station (BS) device includes a terminal grouping unit to group terminals associated with the BS device into a plurality of groups, a radio resource assignment unit to allocate a radio resource assigned to the BS device to each of the plurality of groups, a transmission unit to transmit information about a radio resource assigned to a first group of the plurality of groups to a terminal included in the first group, and a receiving unit to receive a ranging signal from the terminal using the radio resource assigned to the first group, wherein the terminal grouping unit assigns the terminal to be included in a second group of the plurality of groups where the ranging signal is not received by the receiving unit.

17 Claims, 6 Drawing Sheets

SYSTEM FOR RANGING BASED ON PARTITIONED RADIO RESOURCE

CROSS-REFERENCE TO RELATED APPLICATION

This application claims the benefit under 35 U.S.C. §119(a) of a Korean Patent Application No. 10-2008-0029837, filed on Mar. 31, 2008 in the Korean Intellectual Property Office, the entire disclosure of which is incorporated herein by reference.

TECHNICAL FIELD

The following description relates to a wireless communication, and more particularly, to a method of ranging in a wireless communication system and a communication apparatus and/or system using the same.

BACKGROUND

There have been increasing demands for a system for supporting high-speed data transmission in a mobile communication environment. In a mobile communication environment, each of terminals may be connected with a base station to transmit/receive high-speed data. So that the terminal is connected with the base station to transmit/receive data, the terminal and the base station may be required to be synchronized.

The terminal may be synchronized with the base station based on preamble signals transmitted from the base station. In general, a plurality of terminals may be connected with a single base station, and distances from the base station to each of the terminals may be different from each other. Accordingly, a propagation delay time for each terminal may be different from each other. The propagation delay time from the base station to the terminal may be not detected using only the preamble signals received from the base station.

In a communication system using an orthogonal frequency division multiple access (OFDMA) scheme, where a propagation delay time is greater than a predetermined time, interference between signals received from each of the terminals may occur. Accordingly, a receiving performance of the base station may be deteriorated, and thus high-speed data transmission may not be achieved.

Ranging signals may be used in order to synchronize the base station and the terminal in an uplink of a data transmission system. Each of the terminals may transmit the ranging signals to the base station, and the base station may measure the propagation delay time from the terminal to the base station, a frequency deviation, and the like, based on the ranging signals. The base station may synchronize the base station with the terminal based on the measured propagation delay time.

Where the terminal is initially connected with the base station or performs a handover to a new base station, a ranging process may be performed.

Where a plurality of terminals intends to simultaneously perform the ranging process with respect to a specific base station, the ranging signals transmitted by each of the plurality of terminals may collide with each other. In this case, the terminal may recognize the collision, and transmit new ranging signals.

Where a time required for performing the ranging process increases, an unnecessary load may be applied to the communication system, and a failure of the data transmission may occur. Accordingly, there is a need for a ranging scheme that may increase a ranging success rate and reduce a ranging process time.

SUMMARY

In one general aspect, a base station (BS) device and a terminal are provided to increase a ranging success rate and reduce a ranging process time.

In another general aspect, there is provided a BS device and a terminal which reassigns radio resources according to a ranging success rate of the terminal.

In still another general aspect, a base station (BS) device comprises a terminal grouping unit to group terminals associated with the BS device into a plurality of groups, a radio resource assignment unit to allocate a radio resource assigned to the BS device to each of the plurality of groups, a transmission unit to transmit information about a radio resource assigned to a first group of the plurality of groups to a terminal included in the first group, and a receiving unit to receive a ranging signal from the terminal using the radio resource assigned to the first group. The terminal grouping unit may allow the terminal to be included in a second group of the plurality of groups where the ranging signal is not received by the receiving unit.

The transmission unit may transmit, to the terminal, information about a radio resource assigned to the second group, and the receiving unit may receive the ranging signal from the terminal using the radio resource assigned to the second group.

The radio resource assignment unit may allocate the radio resource based on a number of terminals included in each of the plurality of groups.

The radio resource assignment unit may allocate the radio resource so that an amount of the radio resource assigned to each of the plurality of groups is substantially equal with respect to the number of terminals assigned to each of the plurality of groups.

The radio resource may be at least one of a ranging code, a time slot, and a frequency band, each being associated with the BS device.

The radio resource assignment unit may calculate a receiving success probability of a ranging signal with respect to each of the plurality of groups, and reassign the radio resource based on the calculated probability.

The transmission unit may transmit a ranging response signal to the terminal where the receiving unit receives the ranging signal.

In yet another general aspect, a terminal comprises a receiving unit to receive information about a first radio resource assigned to a base station (BS) and a transmission unit to transmit a ranging signal to the BS based on the received information about the first radio resource. Where a ranging response signal corresponding to the ranging signal is not received by the receiving unit, the receiving unit may receive information about a second radio resource from the BS and the transmission unit may transmit the ranging signal to the BS based on the information about the second radio resource.

The first or second radio resource may be at least one of a ranging code, a time slot, and a frequency band, each being associated with the BS device.

In yet another general aspect, a ranging method comprises grouping terminals associated with a base station (BS) device into a plurality of groups, allocating a radio resource assigned to the BS device to each of the plurality of groups, transmitting, to a terminal included in a first group of the plurality of groups, information about a radio resource assigned to the first group, receiving a ranging signal from the terminal using the radio resource assigned to the first group, and in response to not receiving the ranging signal, assigning the terminal to be included in a second group of the plurality of groups.

The ranging method may further comprise transmitting, to the terminal, information about a radio resource assigned to the second group and receiving the ranging signal from the terminal using the radio resource assigned to the second group.

The allocating of the radio resource may comprise assigning the radio resource based on a number of terminals included in each of the plurality of groups.

The allocating of the radio resource may comprise assigning the radio resource so that an amount of the radio resource assigned to each of the plurality of groups is substantially equal with respect to the number of terminals assigned to each of the plurality of groups.

The radio resource may be at least one of a ranging code, a time slot, and a frequency band, each being associated with the BS device.

The ranging method may further comprise calculating a receiving success probability of a ranging signal with respect to each of the plurality of groups, wherein the allocating of the radio resource may comprise reassigning the radio resource based on the calculated probability.

The ranging method may further comprise transmitting a ranging response signal to the terminal in response to receiving the ranging signal.

Other features will become apparent to those skilled in the art from the following detailed description, which, taken in conjunction with the attached drawings, discloses exemplary embodiments of the invention

BRIEF DESCRIPTION OF THE DRAWINGS

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, description of well-known functions and constructions are omitted to increase clarity and conciseness.

Figure 1A:
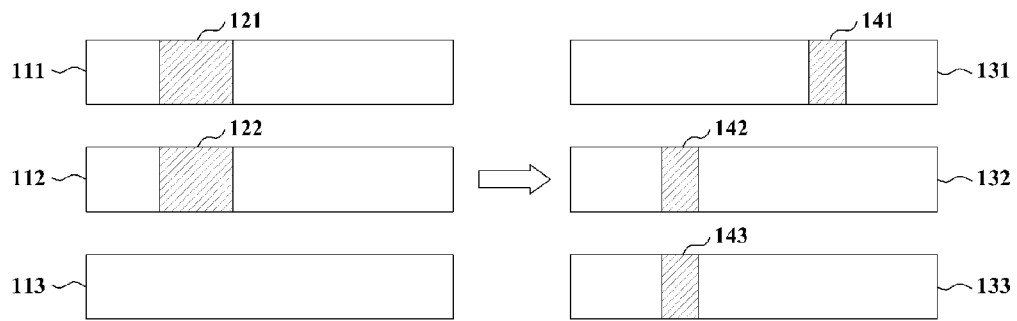
FIGS. 1A and 1B are diagrams illustrating transmitting ranging signals using partitioned radio resources according to an exemplary embodiment.
Figure 1B:
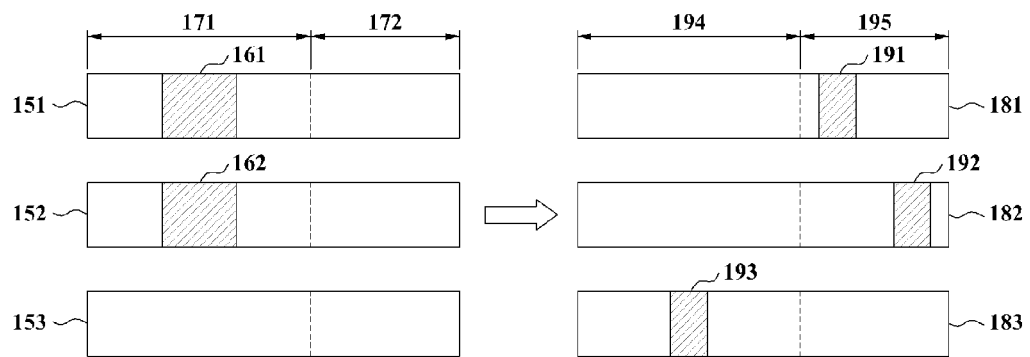

FIGS. 1A and 1B are provided to illustrate a method of transmitting ranging signals using divided radio resources according to an exemplary embodiment.

In particular, FIG. 1A is a schematic diagram illustrating ranging messages transmitted by a plurality of terminals that collide with each other where the ranging messages are transmitted using non-divided radio resources. Each of the plurality of terminals may transmit a ranging message in order to connect with a base station. For example, each of the plurality of terminals may transmit a ranging message to the base station in order to initially connect with a wireless network. Also, a terminal connected with a first base station may transmit a ranging message to a second base station to perform a handover to the second base station.

Referring to FIG. 1A, each of the plurality of terminals may select specific time slots 121 and 122 within respective time frames 111, 112, and 113 to transmit a ranging message. Each of the plurality of terminals may arbitrarily select the time slots 121 and 122 to transmit the ranging message. While the time slots may not be assigned to each of the plurality of terminals to avoid colliding with each other, each of the plurality of terminals may select an identical time slot. Where the plurality of terminals select the identical time slot, the ranging messages transmitted by each of the plurality of terminals may collide with each other, and the base station may not accurately receive any of the message from the plurality of terminals.

The base station may transmit a ranging response message to a terminal transmitting a ranging message within a predetermined period after receiving the ranging message from the terminal successfully. The terminal may determine that transmission of the ranging message is unsuccessful where the terminal does not receive the ranging response message from the base station within a predetermined period after transmitting the ranging message to the base station.

Where ranging signals transmitted by a plurality of terminals collide with each other, the terminal may re-select specific time slots 141 and 142 of the following time frames 131, 132, and 133 to re-transmit the ranging message. For example, referring again to FIG. 1A, two terminals selecting identical time slots 121 and 122 in the first time frames 111 and 112 select different time slots 141 and 142 in the second time frames 131 and 132.

Where a ranging message is transmitted without dividing the radio resources, the terminal re-transmitting the ranging message and a terminal initially transmitting a ranging message may select identical time slots 142 and 143. In this case, the base station may not receive even the re-transmitted ranging message.

Since the radio resources selected by the re-transmitting terminal and the initially transmitting terminal are not divided, the re-transmitting terminal and the initially transmitting terminal may compete with each other in an identical condition to transmit the ranging message.

FIG. 1B is a diagram illustrating an exemplary embodiment in which a ranging signal is transmitted using divided radio resources. A time frame in which terminals are capable of transmitting the ranging message may be divided into a first time region 171 and a second time region 172.

According to an aspect, the terminals initially transmitting the ranging message may select arbitrary time slots 161 and 162 in the first time region 171 to transmit the ranging message. Also, the terminals re-transmitting the ranging message may select an arbitrary time slot in the second time region 172.

FIG. 1B illustrates an exemplary embodiment in which three terminals transmit a ranging message to a base station. First and second terminals select identical time slots 161 and 162 to transmit the ranging message. The base station may not receive any message, and each of the first and second terminals may be required to re-transmit the ranging message.

The first and second terminals may select any one of the time slots 191 and 192 of a second time region 195 to re-transmit the ranging message. Also, a third terminal initially transmitting a ranging message may select a time slot 193 of a first time region 194 to transmit the ranging message. Since the time regions 194 and 195 capable of being selected by the initially transmitting terminal, that is, the third terminal, and the re-transmitting terminal, that is, the first and second terminals, are divided, collision may be prevented.

The terminals re-transmitting the ranging message may select an identical time slot. Accordingly, according to an aspect, a number of terminals re-transmitting the ranging message and a number of time slots capable of being selected by the re-transmitting terminals may be controlled to reduce the probability of collision at the time of re-transmitting.

As a convenience of description, an exemplary embodiment has been described where terminals select time slots to transmit a ranging message. However, it is understood that this is for illustration only and other resources may be utilized. For example, according to another exemplary embodiment, terminals may select frequency band resources, ranging code resources, as well as time resources, to transmit ranging codes to a base station. In this case, the time resources, the frequency band resources, and the ranging code resources may be referred to as radio resources. Also, according to another exemplary embodiment, terminals may use a plurality of radio resources to transmit a ranging signal. In this case, where remaining radio resources are different from each other although any one of the radio resources may be identical, the ranging message may be successfully transmitted to the base station.

According to another exemplary embodiment, a base station may assign a first radio resource to terminals initially transmitting a ranging signal, and a second radio resource to terminals re-transmitting the ranging signal. The terminals re-transmitting the ranging signal may exclusively use the second radio resource. According to another exemplary embodiment, a probability of transmission success of the ranging message may be controlled considering a number of terminals re-transmitting the ranging message and an amount of the second radio resource.

Figure 2:
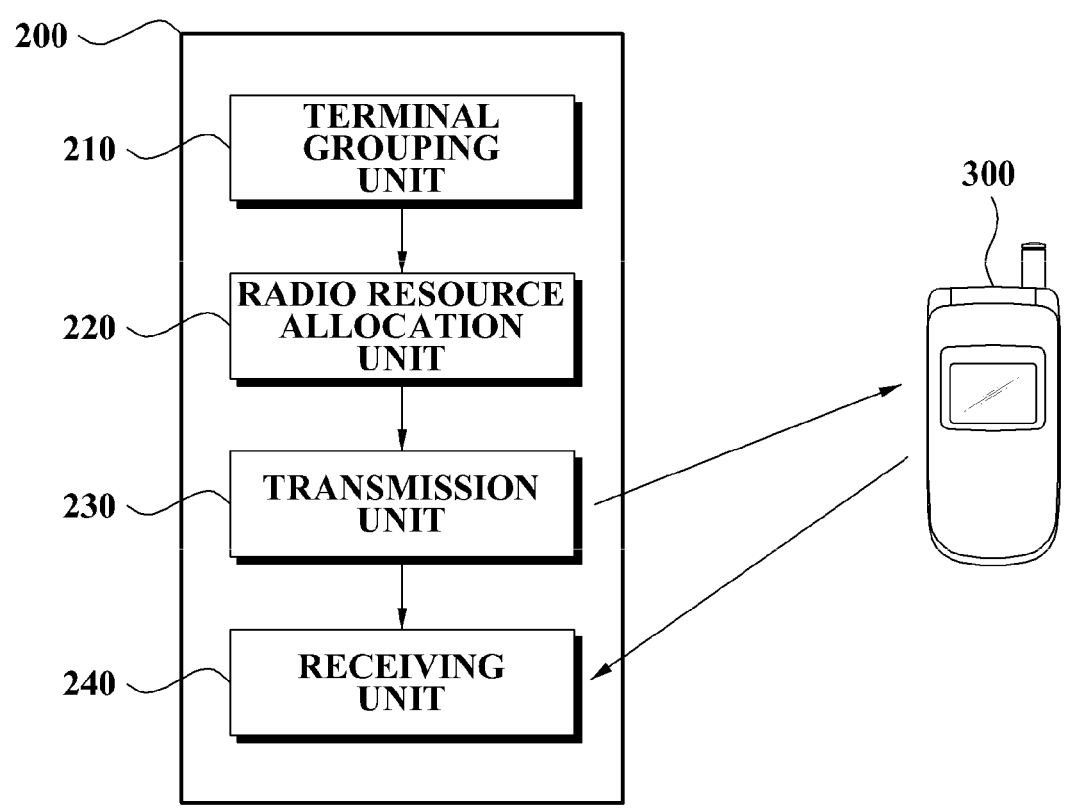
FIG. 2 is a block diagram illustrating a structure of a base station (BS) device transmitting information about divided radio resources according to an exemplary embodiment.

FIG. 2 illustrates a base station (BS) device 200 transmitting information about divided radio resources according to an exemplary embodiment. As illustrated in FIG. 2, the BS device 200 comprises a terminal grouping unit 210, a radio resource allocation unit 220, a transmission unit 230, and a receiving unit 240.

The terminal grouping unit 210 divides terminals associated with the BS device into a plurality of groups. According to an aspect, the terminal grouping unit 210 may divide the plurality of terminals into a terminal group initially transmitting a ranging message and a terminal group re-transmitting a ranging message. Also, the plurality of terminals may be divided depending on a re-transmission frequency of the ranging message.

According to an aspect, the terminal grouping unit 210 may divide the plurality of terminals into a terminal group transmitting a ranging message to connect with a radio network, and a terminal group transmitting a ranging message to perform a handover from a first base station to a second base station.

The radio resource allocation unit 220, also referred to as a radio resource assignment unit, assigns the radio resources assigned to the BS device to each of the groups. According to an aspect, the radio resource may include at least one of a ranging code, a time slot, and a frequency band, each capable of being selected by each of the terminals for the purpose of transmitting the ranging message.

The transmission unit 230 transmits information about radio resources assigned to a first group to a terminal(s) included in the first group. That is, a terminal 300 receiving the information about the radio resources may select a specific radio resource from among the radio resources assigned to the first group, and transmit a ranging message using the selected radio resource to the BS 200. The receiving unit 240 receives the ranging signal from the terminal 300 using the radio resources assigned to the first group. According to an aspect, where a plurality of terminals are associated with a specific base station, the plurality of terminals may select an identical radio resource, and transmit a ranging message using the selected radio resource.

According to an aspect, a terminal may select radio resources different from each other. For example, the terminal may select a specific ranging code and a specific time slot, and transmit a ranging message to the selected time slot using the selected ranging code. Where ranging codes with respect to each of a plurality of ranging messages are different from each other even where a base station receives the plurality of ranging messages in an identical time slot, the base station may successfully receive each of the plurality of ranging messages.

Hereinafter, it is noted that an identical radio resource is described to be selected only where each of the radio resources selected by a terminal is identical to each other, where the terminal selects radio resources different from each other.

According to an aspect, where the receiving unit 240 successfully receives a ranging message, the transmission unit 230 may transmit a ranging response signal to a terminal transmitting the ranging message. The terminal not successfully receiving the ranging response signal may be determined to fail in transmission of the ranging message. The terminal which fails in transmission of the ranging message may re-transmit the ranging message.

Where the plurality of terminals selects an identical radio resource, the receiving unit 240 may not receive any ranging message. In this case, the terminal grouping unit 210 may assign, to the second group, the terminal which fails in transmission of the ranging message. The transmission unit 230 may transmit, to the terminal which fails in transmission of the ranging message, information about a radio resource assigned to the second group, and the terminal may re-transmit the ranging message using the radio resource assigned to the second group. The receiving unit 240 may receive the ranging signal using the radio resource assigned to the second group.

According to an aspect, the radio resource allocation unit 220 may assign radio resources based on a number of terminals included in each of the groups. According to an aspect, a relatively greater number of radio resources may be assigned to the second group including the terminal re-transmitting the ranging message. Where the relatively greater number of radio resources are assigned to the second group, a probability of a collision occurring between radio resources of the terminals re-transmitting the ranging message may be reduced in the case of re-transmitting the ranging message, and a transmission success probability of the ranging message at the time of re-transmitting the ranging message may become higher than at the time of initially transmitting the ranging message.

According to an aspect, the radio resource allocation unit 220 may assign a radio resource to each of the groups so that an amount of the radio resource assigned to each of the groups may be substantially equal with respect to a number of terminals assigned to each of the groups. The amount of the radio resource capable of being selected by the terminal included in each of the groups is proportion to a number of terminals included in each of the groups. A probability of transmission failure of a ranging message which is transmitted by the terminal included in each of the groups is identical with respect to each of the groups, so that the radio resource allocation unit 220 may uniformly assign the radio resources with respect to each of the groups.

According to an aspect, the radio resource allocation unit 220 may calculate a receiving success probability of a ranging message with respect to each of the groups, and re-assign a radio resource based on the calculated probability. The terminals included in each of the groups may move to another group due to various factors. Specifically, a number of terminals included in each of the groups may vary. The radio resource allocation unit 220 may re-assign a radio resource to each of the groups to control the receiving success probability of the ranging message with respect to each of the groups.

Figure 3:
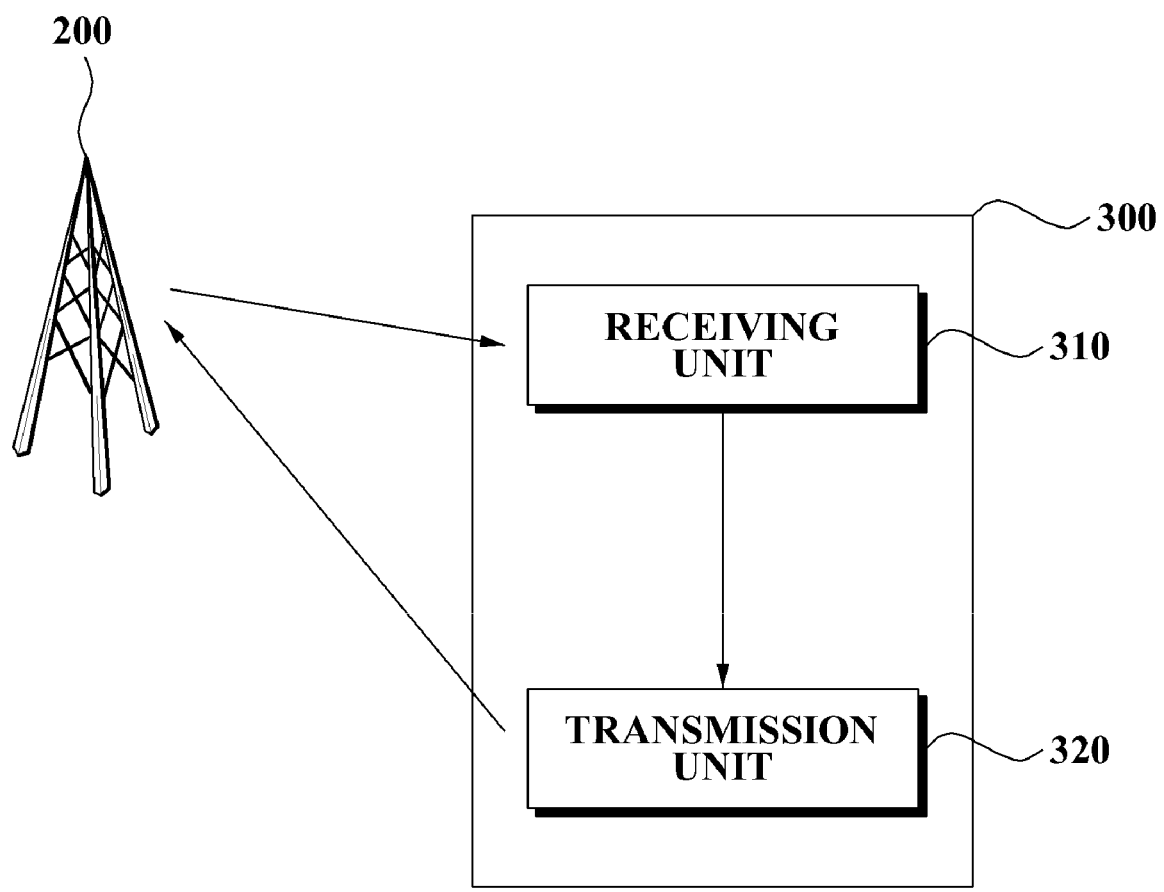
FIG. 3 is a block diagram illustrating a structure of a terminal transmitting ranging signals using divided radio resources according to an exemplary embodiment.

FIG. 3 illustrates a terminal 300 transmitting ranging signals using divided radio resources according to an exemplary embodiment. As illustrated in FIG. 3, the terminal 300 comprises a receiving unit 310 and a transmission unit 320.

The receiving unit 310 receives information about a first radio resource from among entire radio resources assigned to a base station. According to an aspect, the first radio resource may include at least one of a ranging code, a time slot, and a frequency band, each being associated with the base station.

The transmission unit 320 transmits the ranging message to the base station based on information about the received first radio resource.

The receiving unit 310 may receive a ranging response message from the base station 200 in response to the transmitted ranging message. Where the receiving unit 310 does not receive the ranging response message, it may be determined that the transmission of the ranging message from transmission unit 320 to the base station did not succeed. According to an aspect, where the receiving unit 310 does not receive the ranging response message for a predetermined period after the transmission unit 320 transmits the ranging message, it is determined to be a transmission failure of the ranging message.

In the case of the transmission failure of the ranging message using the first radio resource, the receiving unit 310 receives information about a second radio resource from a base station 200. The transmission unit 320 may transmit a ranging message to the base station 200 based on the information about the second radio resource.

Figure 4:
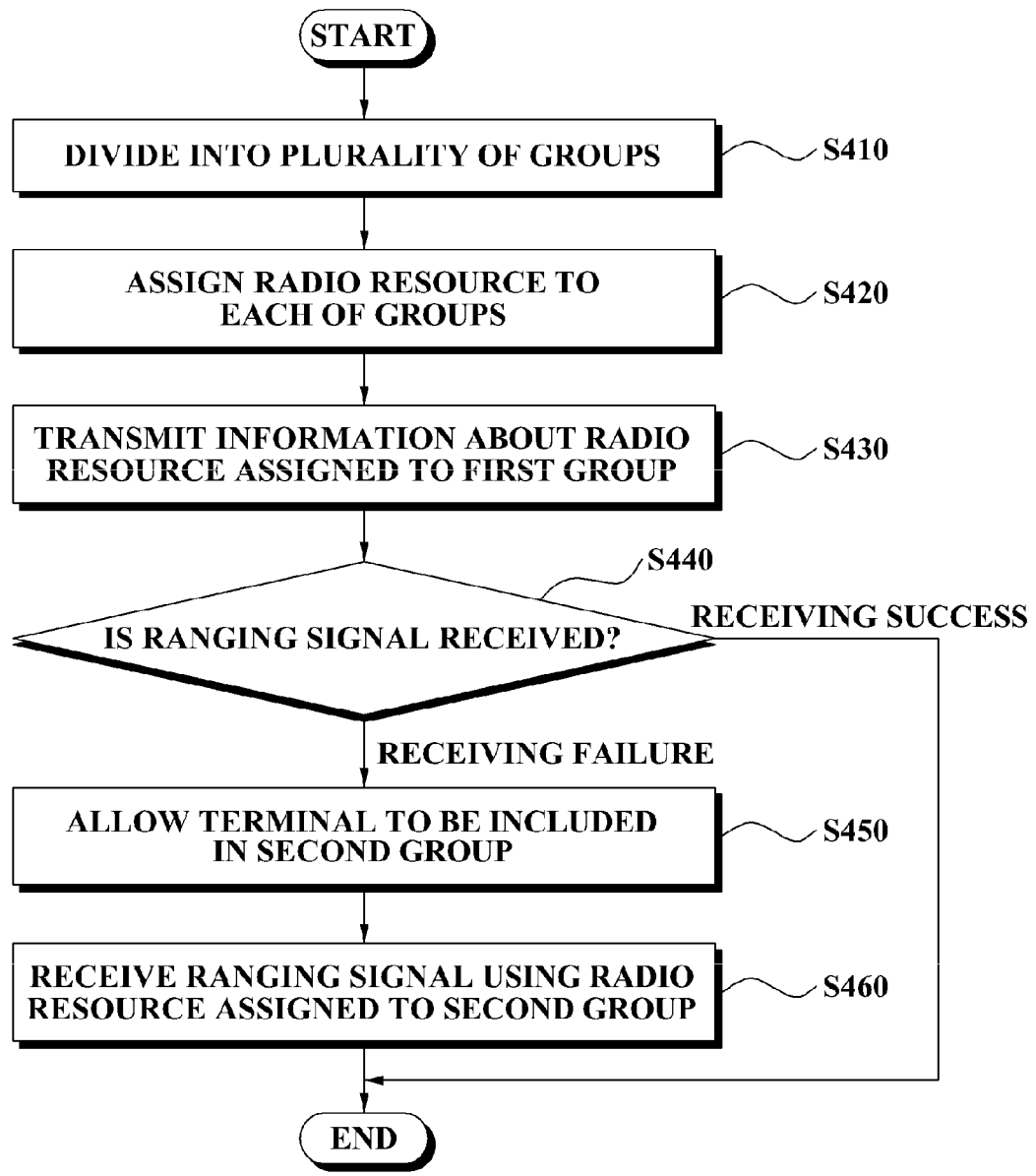
FIG. 4 is a diagram illustrating a method of receiving ranging signals using divided radio resources in a stepwise manner according to an exemplary embodiment.

FIG. 4 illustrates a method of receiving ranging signals using divided radio resources according to an exemplary embodiment.

In operation S410, terminals associated with a BS device are divided into a plurality of groups. According to an aspect, terminals initially transmitting a ranging message may be grouped into a first group, and terminals re-transmitting a ranging message may be grouped into a second group.

According to another aspect, the terminals initially connecting with a radio network may be grouped into a first group, and terminals performing a handover from a first base station to a second base station may be grouped into a second group.

In operation S420, radio resources assigned to the BS device are assigned to each of the groups. According to an aspect, the radio resource may be assigned to each of the groups based on a number of terminals assigned to each of the groups. Where a relatively greater amount of radio resource is assigned to the first group in comparison with a number of terminals assigned to the first group, a transmission success probability of a ranging message of a terminal included in the first group may increase.

According to another aspect, in the operation S420, the radio resource may be assigned so that an amount of radio resource assigned to each of the groups may be substantially equal with respect to a number of terminals assigned to each of the groups.

According to an aspect, the radio resource assigned in the operation S420 may include at least one of a ranging code, a time slot, and a frequency band each being associated with the base station.

In operation S430, information about the radio resource assigned to the first group is transmitted to the terminal included in the first group. The terminal may transmit the ranging message to the base station using the information about the radio resource.

In operation S440, the base station receives the ranging message transmitted from the terminal included in the first group using the radio resource assigned to the first group. According to an aspect, where the ranging message is received from the terminal, the base station may transmit a ranging response message to the terminal in response to the ranging message. The terminal receiving the ranging response message may determine that the ranging message is successfully transmitted.

In operation S450, the base station may assign the terminal to be included in the second group where the base station does not receive the ranging message in the operation S440. According to an aspect, an operation in which the base station transmits, to the terminal included in the second group, information about the radio resource assigned to the second group, may be further included.

In operation S460, the ranging signal from the terminal using the radio resource assigned to the second group may be re-received.

According to an aspect, an operation for calculating a receiving success probability of the ranging signal with respect to each of the groups may be included, and the operation S420 may reassign the radio resource based on the calculated probability. A number of terminals included in each of the groups may vary depending on whether the transmission of the ranging message is made successful, or depending on whether a handover of the terminals included in each of the groups is successfully performed. According to an aspect, in the operation S420, the ranging signal may be re-transmitted, or a relatively greater amount of radio resource may be assigned to the second group which includes the terminal performing the handover. As the amount of radio resource assigned to a specific group increases, a transmission success probability of the ranging message of the terminals included in the specific group increases.

In the exemplary embodiment of FIG. 4, the terminals initially transmitting the ranging message and the terminals re-transmitting the ranging message are grouped. However, in another exemplary embodiment, terminals associated with a specific base station may be grouped into a plurality of groups and a radio resource may be assigned to each of the plurality of groups.

Figure 5:
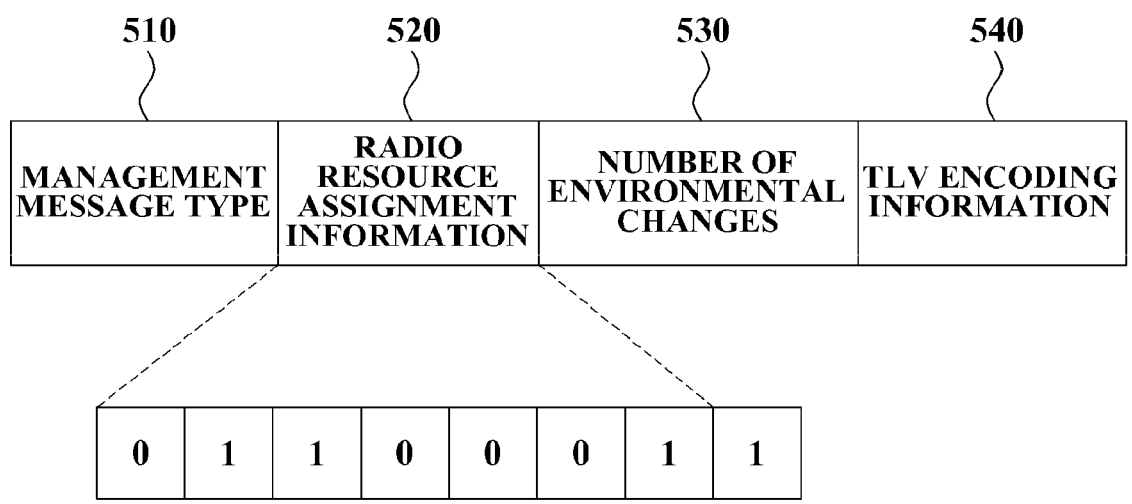
FIG. 5 is a diagram illustrating a structure of a data frame for transmitting information about divided radio resources to a terminal according to an exemplary embodiment.

FIG. 5 illustrates a structure of a data frame for transmitting information about divided radio resources to a terminal according to an exemplary embodiment.

According to an aspect, a base station is required to transmit information about radio resources assigned to each of the terminals. The base station may transmit the information about radio resources utilizing a data frame defined in the IEEE 802.16e standard. Since the information about radio resources is transmitted using unused parts from among the data frame defined in the standard, the standard may not need to be changed.

In FIG. 5, the structure of the data frame including a Downlink Channel Descriptor (DCD) message according to the IEEE 802.16e standard is illustrated. The DCD message comprises a management message type 510, a configuration change count 530 that denotes the number of environmental changes, Type/Length/Value (TLV) encoding information 540 for the overall channel, and a reserved region 520 that may be used for radio resource assignment information. According to an aspect, information about the radio resource may be transmitted using the reserved region 520.

While the structure of the data frame including the DCD message is illustrated in FIG. 5, according to another exemplary embodiment, radio resource assignment information may be transmitted using a reserved region within a data frame including the ranging response message.

According to an aspect, a BS device may allow information about a boundary of the radio resources assigned to the first and second groups to be included in the radio resource assignment information 520, and transmit the radio resource assignment information 520 to the terminal. According to an aspect, the BS device may allow a greatest value from among numbers of the radio resource assigned to the first group to be included in the radio resource assignment information 520, and transmit the radio resource assignment information 520 to the terminal.

The BS device may allow a ranging code value of '99' to be included in the radio resource assignment information 520, and transmit the radio resource assignment information 520 to the terminal. In this case, the BS device may assign ranging codes of '1' to '99' to the first group, and ranging codes exceeding '99' to the second code, respectively.

Figure 6A:
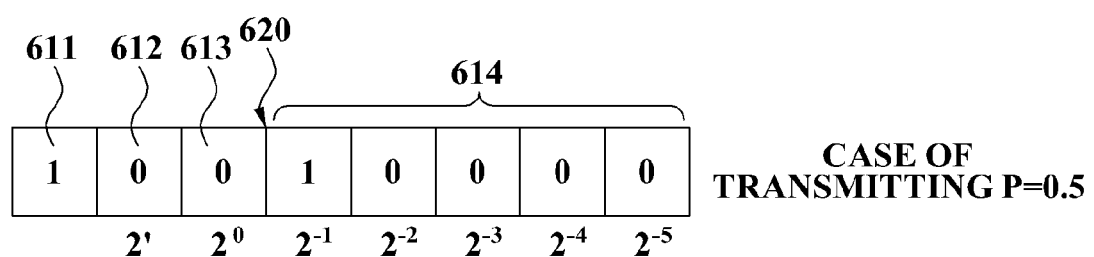
FIGS. 6A and 6B are diagrams illustrating a structure of a data frame for transmitting information about a ratio of divided radio resources to a terminal according to an exemplary embodiment.
Figure 6B:
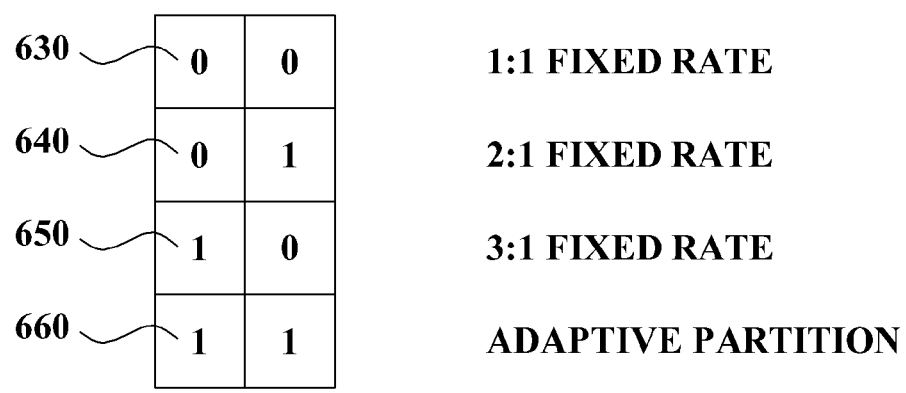

FIGS. 6A and 6B illustrate a structure of a data frame for transmitting to a terminal, information about a ratio of divided radio resources according to an exemplary embodiment.

According to an aspect, a BS device may fixedly assign radio resources to each of groups. In this case, an amount of radio resource assigned to each of the groups may not be changed although a number of terminals included in each of the groups are changed. The BS device may set a specific bit 611 of the radio resource assignment information 520 to be '1', so as to indicate a ratio of the radio resource assigned to each of the groups is fixed. Since each of the terminals receives the radio resource assignment information only one time, a received power of the terminal may be reduced.

According to an aspect, the BS device may change the amount of the radio resource assigned to each of the groups based on the number of terminals included in each of the groups. In this case, the BS device may set the specific bit 611 of the radio resource assignment information 520 to be '0', so as to indicate that a ratio of the radio resource assigned to each of the groups may be dynamically changed. Since the radio resource is reassigned according to the changed environment, a probability that the terminal successfully transmits the ranging message increases, and a time required for transmitting the ranging message may be reduced.

According to an aspect, the BS device may quantize a radio resource assignment ratio (p) of the radio resource assigned to the second group with respect to the radio resource assigned to the first group, and allow the quantized radio resource assignment ratio (p) to be included in the radio resource assignment information 520 and transmit the radio resource assignment information 520 to the terminal. The radio resource assignment information 520 transmits the quantized ratio using bits 612 and 613 indicating values more than a decimal point 620 and bits 614 indicating values less than the decimal point 620.

In FIG. 6A, a ratio (p) of the radio resource assigned to the first group and the ratio resource assigned to the second group is '0.5'.

According to an aspect, the terminal may select the radio resources different from each other. Specifically, the terminal may select a ranging code and a time slot, and transmit the ranging message to the BS device using the selected ranging code and time slot. In the case, where a plurality of terminals transmit the ranging message to the BS device, where the ranging codes are different from each other or the time slots are different from each other, the BS device may successfully receive the ranging message.

Where the terminal may select the radio resources different from each other, the BS device may transmit the radio resource assignment information about each of the radio resources. According to an aspect, two bits from among a plurality of bits of the radio resource assignment information 520 may be used in order to transmit the radio resource assignment information about each of the radio resources.

Referring to FIG. 6B, where the radio resource assignment information is '00', a ratio of the radio resource assigned to the first group with respect to the radio resource assigned to the second group may be a fixed ratio of '1:1' as illustrated at a first row 630. Where the radio resource assignment information is '01', the ratio of the same may be a fixed ratio of '2:1' as illustrated at a second row 640. Where the radio resource assignment information is '10', the ratio of the same may be a fixed ratio of '3:1' as illustrated at a third row 650. Where the radio resource assignment information is '11', the ratio of the same may be adaptively changed as illustrated at a fourth row 660.

Without limiting thereto, certain embodiments described above including a ranging system and method may be applied to a wireless Local Area Network (LAN) or a wireless broadband (WiBro) environment according to an exemplary embodiment.

The methods described above including a method for receiving ranging signals may be recorded, or fixed in one or more computer-readable media that includes program instructions to be implemented by a computer to case a processor to execute or perform the program instructions. The media may also include, independent or in combination with the program instructions, data files, data structures, and the like. The media and program instructions may be those specially designed and constructed for the purposes of the present invention, or they may be of the kind well-known and available to those having skill in the computer software arts. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station (BS) device, comprising:
   a terminal grouping unit configured to group terminals associated with the BS device into a plurality of groups;
   a radio resource assignment unit configured to allocate a radio resource assigned to the BS device to each of the plurality of groups;
   a transmission unit configured to transmit information about a radio resource assigned to a first group of the plurality of groups to a terminal included in the first group; and
   a receiving unit configured to receive a ranging signal from the terminal using the radio resource assigned to the first group,
   wherein the terminal grouping unit allows the terminal to be included in a second group of the plurality of groups where the ranging signal is not received by the receiving unit.

2. The BS device of claim 1, wherein the transmission unit transmits, to the terminal, information about a radio resource assigned to the second group, and the receiving unit receives the ranging signal from the terminal using the radio resource assigned to the second group.

3. The BS device of claim 1, wherein the radio resource assignment unit allocates the radio resource based on a number of terminals included in each of the plurality of groups.

4. The BS device of claim 3, wherein the radio resource assignment unit allocates the radio resource so that an amount of the radio resource assigned to each of the plurality of groups is substantially equal with respect to the number of terminals assigned to each of the plurality of groups.

5. The BS device of claim 1, wherein the radio resource is at least one of a ranging code, a time slot, and a frequency band, each being associated with the BS device.

6. The BS device of claim 1, wherein the radio resource assignment unit calculates a receiving success probability of a ranging signal with respect to each of the plurality of groups, and reassigns the radio resource based on the calculated probability.

7. The BS device of claim 1, wherein the transmission unit transmits a ranging response signal to the terminal, where the receiving unit receives the ranging signal.

8. A terminal, comprising:
   a receiving unit configured to receive information about a first radio resource assigned to a base station (BS); and
   a transmission unit configured to transmit a ranging signal to the BS based on the received information about the first radio resource,
   wherein where a ranging response signal corresponding to the transmitted ranging signal is not received by the receiving unit, the receiving unit is configured to receive information about a second radio resource from the BS and the transmission unit is configured to transmit the ranging signal to the BS based on the information about the second radio resource.

9. The terminal of claim 8, wherein the first or second radio resource is at least one of a ranging code, a time slot, and a frequency band, each being associated with the BS device.

10. A ranging method, comprising:
    grouping terminals associated with a base station (BS) device into a plurality of groups;
    allocating a radio resource assigned to the BS device to each of the plurality of groups;
    transmitting, to a terminal included in a first group of the plurality of groups, information about a radio resource assigned to the first group;
    receiving a ranging signal from the terminal using the radio resource assigned to the first group; and
    in response to not receiving the ranging signal, assigning the terminal to be included in a second group of the plurality of groups.

11. The ranging method of claim 10, further comprising:
    transmitting, to the terminal, information about a radio resource assigned to the second group; and
    receiving the ranging signal from the terminal using the radio resource assigned to the second group.

12. The ranging method of claim 10, wherein the allocating of the radio resource comprises assigning the radio resource based on a number of terminals included in each of the plurality of groups.

13. The ranging method of claim 12, wherein the allocating of the radio resource comprises assigning the radio resource so that an amount of the radio resource assigned to each of the plurality of groups is substantially equal with respect to the number of terminals assigned to each of the plurality of groups.

14. The ranging method of claim 12, wherein the radio resource is at least one of a ranging code, a time slot, and a frequency band, each being associated with the BS device.

15. The ranging method of claim 10, further comprising:
    calculating a receiving success probability of a ranging signal with respect to each of the plurality of groups,
    wherein the allocating of the radio resource comprises reassigning the radio resource based on the calculated probability.

16. The ranging method of claim 10, further comprising:
    transmitting a ranging response signal to the terminal in response to receiving the ranging signal.

17. A computer-readable storage medium storing a program for ranging in a wireless communication system, comprising instructions to cause a computer to:
    group terminals associated with a base station (BS) device into a plurality of groups;
    allocate a radio resource assigned to the BS device to each of the plurality of groups;
    transmit, to a terminal included in a first group of the plurality of groups, information about a radio resource assigned to the first group;
    receive a ranging signal from the terminal using the radio resource assigned to the first group; and
    in response to not receiving the ranging signal, assign the terminal to be included in a second group of the plurality of groups.

* * * * *